United States Patent

Wells et al.

[15] 3,672,441

[45] June 27, 1972

[54] MOLD ASSEMBLY FOR VALVE LIFTERS

[72] Inventors: Milton K. Wells; Arthur S. Hedberg, both of Park Ridge, Ill.

[73] Assignee: Wells Manufacturing Company, Skokie, Ill.

[22] Filed: Jan. 12, 1970

[21] Appl. No.: 2,071

[52] U.S. Cl. .............................. 164/351, 164/35, 164/370, 164/368, 164/129, 249/123
[51] Int. Cl. ...................... B22c 9/02, B22c 9/20, B22c 9/22
[58] Field of Search .................. 164/322, 350, 351, 365, 366, 164/367, 368, 361, 349, 129; 249/122, 123, 119, 107

[56] References Cited

UNITED STATES PATENTS 2,349,498   5/1944   Hatfield ............................. 249/119 X
2,940,142   6/1960   Wells et al. ........................... 249/107

FOREIGN PATENTS OR APPLICATIONS

1,904   3/1880   Great Britain ........................ 249/119

Primary Examiner—J. Spencer Overholser
Assistant Examiner—J. K. Rising
Attorney—Johnson, Dienner, Emrich, Verbeck & Wagner

[57] ABSTRACT

A mold assembly for valve lifters defined by a plurality of identical mold sections arranged in abutting relation. The front and rear faces of each mold section have a plurality of horizontal mold cavities arranged in vertical rows across their widths. Each face has a number of runner passageways which are in communication with the mold cavities in the abutting opposing face to provide a complete mold pattern formed at each parting line between abutting mold sections.

12 Claims, 18 Drawing Figures

MOLD ASSEMBLY FOR VALVE LIFTERS

BACKGROUND OF THE INVENTION

The present invention relates to the production of castings, and is more particularly concerned with a novel mold assembly used in the manufacture of valve lifter castings.

In the present state of the art, valve lifter castings are made by using a vertical stack of mold sections. Each mold section is formed with a plurality of vertical mold cavities arranged in a number of horizontally aligned rows. On the bottom surface of each mold section is a number of runner passageways extending over the upper open ends of the vertical mold cavities in the mold section directly below it when the molds are vertically stacked together.

While the valve lifters casted by using the above described mold assemblies are quite satisfactory, we have discovered a new mold assembly which is more economical to make, more efficient to use and is capable of producing a consistent high quality valve lifter casting.

Although it is possible to automatically produce a mold assembly in the form of a vertical stack of mold sections, the operating costs have been found to be quite expensive. The mold assembly of this invention can be automatically made by a commercially available molding machine in which the operating cost for forming each mold section is far less than has heretofore been possible. A mold assembly capable of being made automatically has the added advantages of being produced on a high production basis and having a consistent high quality.

SUMMARY OF THE INVENTION

The mold assembly of this invention consists of a plurality of identical mold sections which may be formed automatically in a molding machine and then assembled together in an abutting relation. On the opposite vertical faces of each mold section, a plurality of horizontal cavities are formed in spaced vertical rows such that the rows in one face are in an offset relationship with respect to the rows in the opposite face. Each face also has a number of elongated recesses which form runner passageways to feed molten metal to the mold cavities in the opposite abutting face of the adjoining mold section.

In one embodiment of this invention, a core member is sandwiched between the abutting faces of adjoining mold sections and each wafer core member has short tapered center ingate openings in communication with the horizontal mold cavities. The advantage of using these wafer core members is that the gate end of the castings cools slowly and is self-annealing for a prolonged period with the result that improved hardness properties are obtained in the casting at the gate end, i.e., reducing the amount of center line internal hard spots or inverse chill often associated with molds not using such a core member.

By reason of the foregoing arrangement, a casting method and mold assembly for valve lifters can be produced automatically by a commercially available molding machine in which each mold cavity has closer tolerances in its casting dimensions than has heretofore been possible. Due to the fact that only one downsprue is needed for the two sets of cavities in the abutting faces, an increase in the iron yield is achieved over prior art horizontal casting techniques which require a downsprue for each set of cavities. Also by using the wafer core to feed molten metal to the ingate of mold cavities on both sides of the parting line of the mold, an increase in the production of castings per core is realized over prior art horizontal casting techniques. Due to the fact that the runner passageways are located only along the ingate portion of the mold cavities, a greater hardness differential between the two ends (cam end and gate end) of the valve lifter castings is possible when compared with prior art molds, resulting in greater wearing properties of the cam face and increased machineability of the gate end, for in the prior art the runner passageways are formed in the bottom surface of each mold section which prolongs the cooling period of the cam end of the cavity in the mold section above the runner passageways with the result that the hardness differential between the two ends is reduced.

In an alternate embodiment of this invention, a mold assembly is provided by assembling together a plurality of identical mold sections in a successive abutting relation. Each mold section has across its front and rear faces a plurality of horizontal mold cavities arranged in a series of vertical rows and a plurality of elongated vertical recesses. The relative position between the mold cavities and vertical runner passageways on the front face of each mold section with respect to those on the rear face is such that the vertical runner passageways on one face overlap with an arcuate portion of mold cavities disposed in the same vertical rows on the abutting opposing face and an arcuate portion the mold cavities on the one face overlap with an arcuate portion of mold cavities on the abutting opposing face, which are diametrically opposite to the arcuate portion overlapped by the vertical runner passageway. By reason of this arrangement of mold cavities and vertical runner passageways, there is provided two diametrically opposite ingates for each horizontal mold cavity with the result that each of the castings will have a more uniform hardness across its gate end.

DESCRIPTION OF DRAWINGS

For a better understanding of the present invention, reference is made to the following description and the attached drawing in which.

DESCRIPTION OF ONE EMBODIMENT

Figure 1:
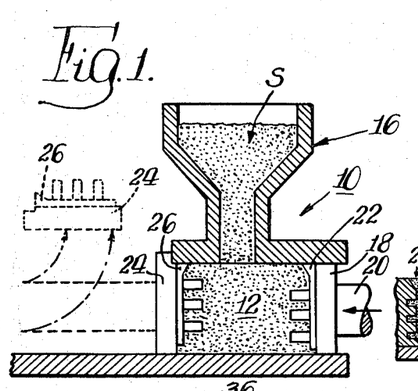
FIGS. 1 and 2 illustrate a schematic showing of a mold machine used for constructing a mold assembly according to the principles of the present invention.
Figure 2:
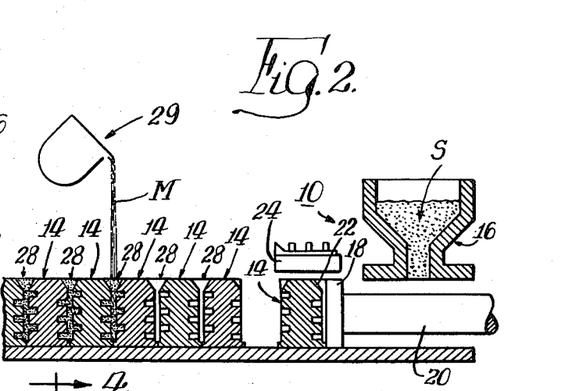

There is shown in FIGS. 1 and 2, a schematic illustration of a molding machine 10 having a molding chamber 12 in which mold sections 14 are continuously and successively made. Since the molding machine 10 forms no part of this invention, it is only schematically represented and will be briefly described hereinafter. One such molding machine which could be used to practice this invention is the Disamatic Molding Machine manufactured by the Disamatic Division of Dansk Industri Syndikat A.S., Herlev, Copenhagen.

Briefly, the molding machine 10 operates as follows. Green sand S is fed to the molding chamber 12 from the hopper 16 by means of compressed air which forces it through an injection aperture (not shown). The injection of the sand into the mold chamber 12 provides a mold of uniformly high hardness. After the molding chamber 12 has been filled and excess air has been exhausted, the rear pressure wall member 18, which is mounted on a hydraulic piston 20 and carries rear pattern plate 22, pushes into the molding chamber 12 until the pressure on the rear face of the mold being formed reaches a preset desired value. During this pressing step, the rear pressure and front counterpressure wall members 18 and 24 are vibrated by vibrators built into the base of mold chamber 12. Next, the front counter pressure wall member 24 is pulled away from chamber 12 while being held absolutely true to the mold surface by a high-precision guide system and thereafter is tilted to a horizontal position (see dotted line), so that the molding chamber 12 is opened in the front. The rear pressure wall member 18 conveys the mold section 14 out of the chamber 12 and up against the rear face of the previously manufactured mold section 14. Thereafter, the entire string of molds is pushed by the rear pressure wall member 18 a distance equal to the thickness of the mold section 14. Front and rear wall members 18 and 22 are then returned to their starting position of FIG. 1 to repeat the process just described.

The pressure wall and counter-pressure wall members 18 and 24 include, respectively, rear and front pattern plates 22 and 26 to provide impressions in the front and rear faces such that the front face of each mold section 14 mates with the rear face of the preceding mold section 14 to form a complete mold pattern 28 at their parting line. At a pouring station (represented by the pouring vessel 29 in FIG. 2) molten metal M is poured into each mold pattern 28.

Figure 3:
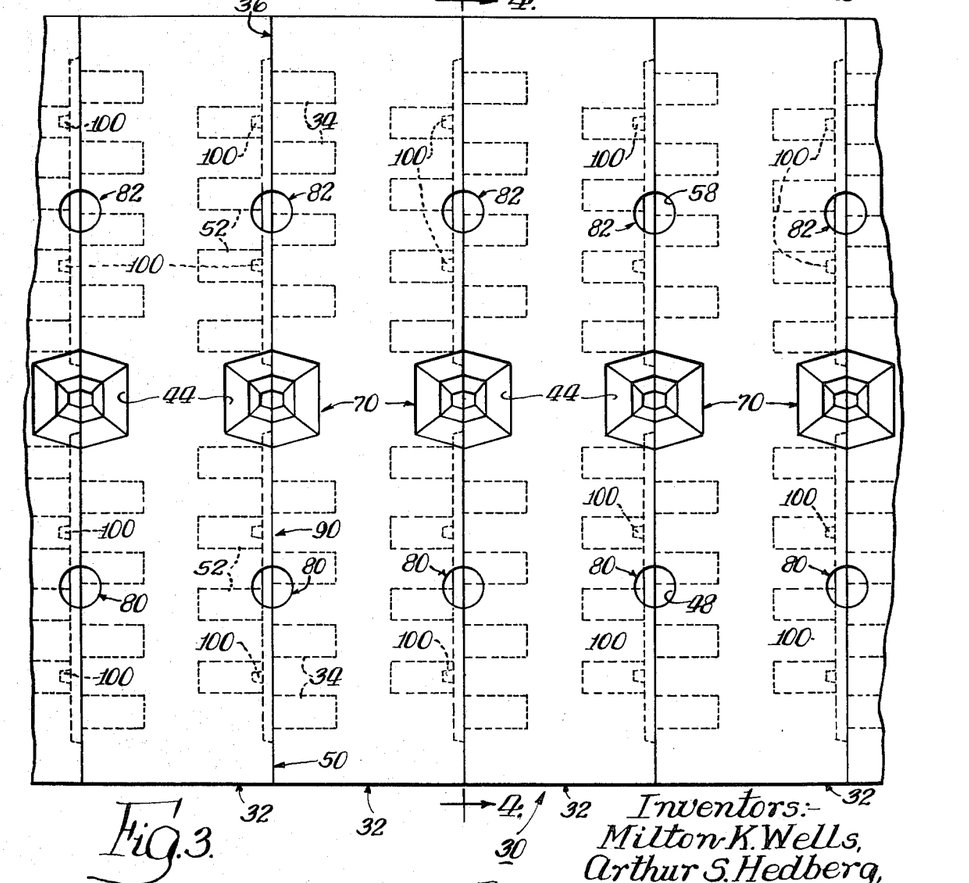
FIG. 3 is a plan view of a mold assembly embodying the principles of the present invention.

There is shown in FIG. 3 a plan view of a mold assembly, illustrating one embodiment of this invention and generally designated by the reference numeral 30, that could be formed by molding machine 10. The mold assembly 30 comprises a plurality of identical mold sections 32 assembled together in an abutting relation.

Figure 4:
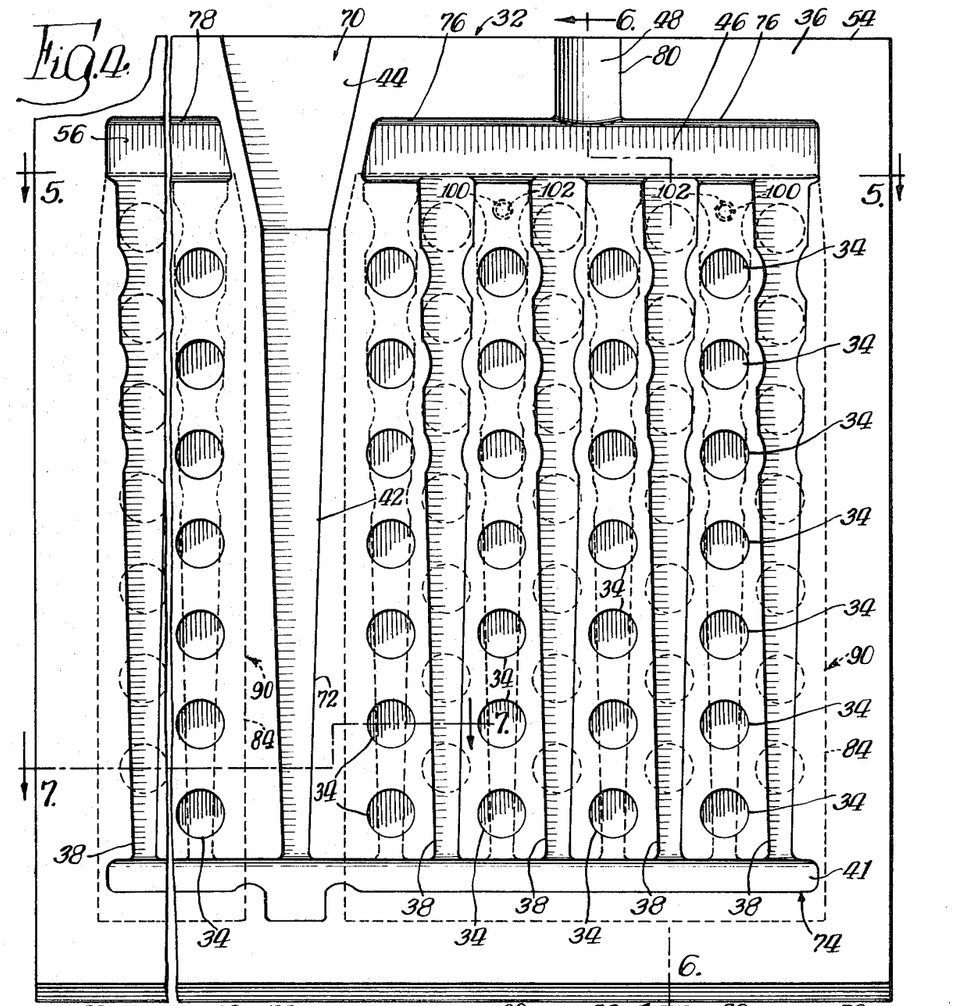
FIG. 4 is a sectional view taken substantially along the line 4—4 of FIG. 3.
Figure 5:
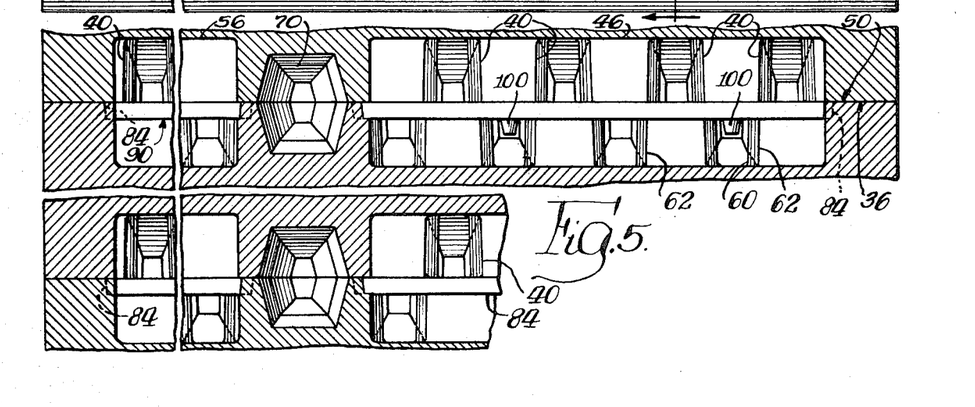
FIG. 5 is a partial sectional horizontal view taken along the line 5—5 of FIG. 4.

Since each of the mold sections 32 is identical in shape and configuration, it will be necessary to describe only one of these mold sections. As shown in FIG. 4, the front face 36 of mold section 32, which forms half of a mold pattern, has a plurality of horizontal mold cavities 34 disposed in a series of spaced vertical rows across its width, and a number of spaced vertical elongated U-shaped recesses 38 (FIG. 5) arranged in an alternate relationship with the vertical rows of mold cavities 34. When the front face 36 is placed in abutting relationship with the rear face of the preceding mold section 32, the U-shaped recesses 38 become vertical runner passageways 40 (see FIGS. 5 and 6) for the mold cavities 52 in the rear face 50 of the preceding mold section.

Figure 6:
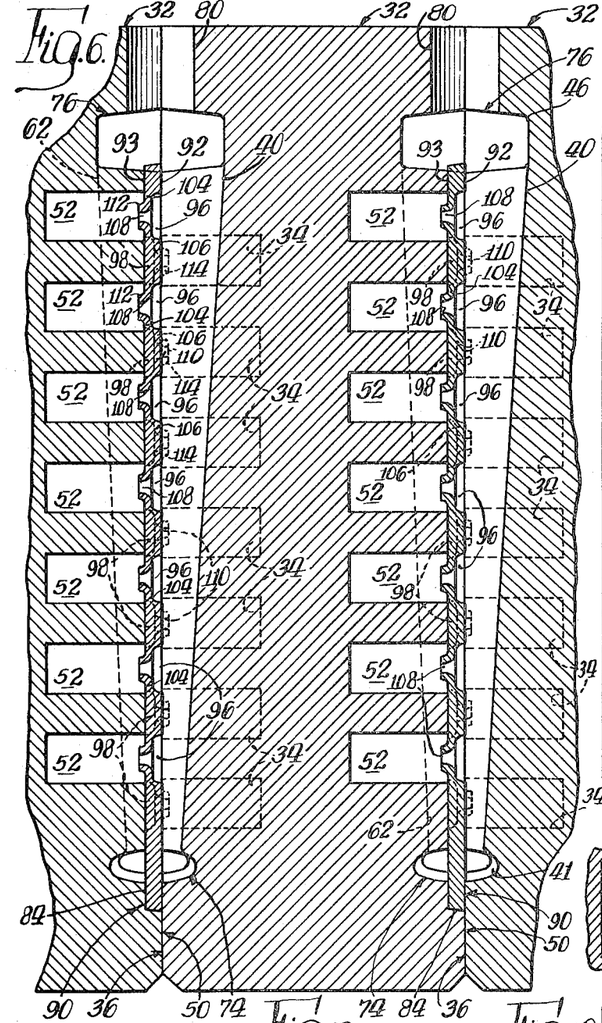
FIG. 6 is a vertical sectional view taken along the line 6—6 of FIG. 4.

The U-shaped recesses 38 taper inwardly in a downward direction along their length in both their width dimension (FIG. 4) and their depth dimension (FIG. 6). The lowered taper ends of each U-shaped recess 38 is interconnected to a lower horizontal U-shaped recess 41 which at its middle section is interconnected to the lower tapered end of a vertical U-shaped recess 42. The upper end of U-shaped vertical recess 42 is in direct communication with another U-shaped recess 44 whose width and depth dimensions are relatively greater than the respective width and depth dimensions of U-shaped recess 42. Interconnected to the upper end of U-shaped recesses 38 on the right side of vertical U-shaped recess 42 (as viewed in FIG. 4) is an upper U-shaped horizontal recess 46 whose size is substantially greater than the lower horizontal arcuate recess 41. A short vertical arcuate recess 48 interconnects the mid-section of upper U-shaped horizontal recess 46 to the top wall 54 of mold section 32. The U-shaped vertical recesses 38 on the left side (as viewed in FIG. 4) of front face 36 are similarly interconnected to an upper horizontal U-shaped recess 56 having a short vertical arcuate recess 58 (FIG. 3) interconnecting its mid-section to top wall 54 of mold section 32.

The rear face 50 of each mold section 32 has a plurality of horizontal cavities 52 with an identical shape to the cylindrical cavities 34 in the front face 36. Cavities 52 are arranged in vertical rows across the rear face 50 and are in an alternate staggered relationship with the mold cavities 34 on the front face 36 of an adjoining mold section 32. The rear face 50 has a plurality of vertical U-shaped recesses 60 identical in shape to the U-shaped recesses 38 on the front face 36. Vertical U-shaped recesses 60 are in an alternate relationship with the vertical rows of the mold cavities 52 in rear face 50, which form vertical runner passageways 62 for the mold cavities 34 in the abutting front face 36 of an adjoining mold section 32.

The rear face 50 of each mold section 32 has recesses identically located and shaped to vertical U-shaped recesses 44, 42, lower horizontal U-shaped recesses 41, upper pair of horizontal U-shaped recesses 46 and 56, and vertical arcuate-shaped recesses 48, 58 which mate with recesses in the abutting front face 36 to provide, respectively, pouring cup 70, a downsprue passageway 72, lower cross runner passageway 74, upper pair of cross runner passageways 76 and 78, and gas ports 80 and 82 (FIG. 3).

Figure 7:
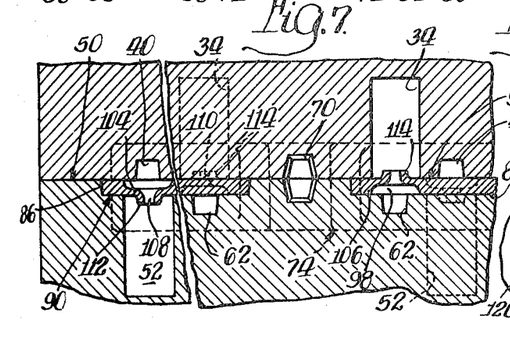
FIG. 7 is a partial sectional view taken substantially along the line 707 of FIG. 4.
Figure 8:
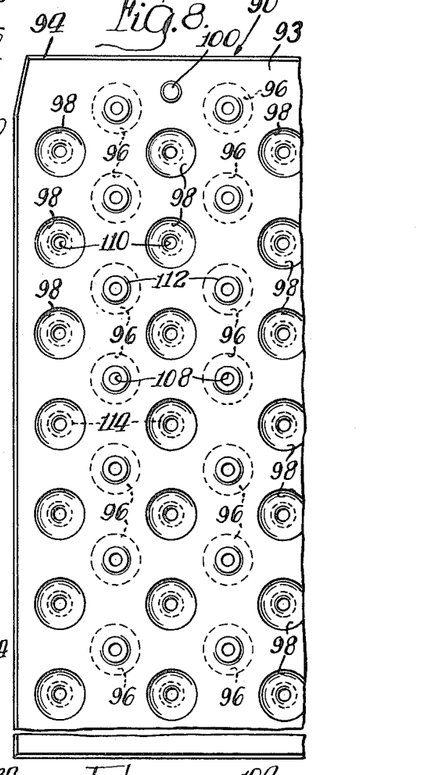
FIG. 8 is a plan view of a sand core member forming a part of this invention and illustrated in FIGS. 3 through 7.
Figure 9:
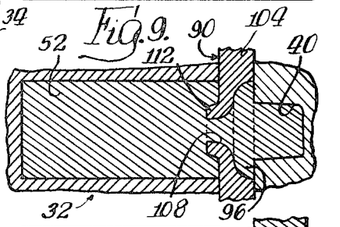
FIG. 9 is an enlarged, fragmentary, sectional view illustrating the arrangement of a single mold cavity of FIGS. 3 through 7 and a portion of the core member providing an entrance thereto with a molten metal filling the cavity and corresponding runner passageway.

The only structural difference between the front face 36 and the rear face 50 of each mold section 32 is that cavities 52 and vertical U-shaped recesses 60 are formed in the rear wall 50 behind a pair of shallow rectangular-shaped recesses 84 and 86, which are disposed on either side of downsprue passageway 72. A novel core member 90 (see FIGS. 7 and 8) is adapted to be received in each of these pair of shallow recesses 84, 86. Each of the core members 90 have an identical rectangular-shaped configuration of a thickness substantially equal to the depth of the recesses 84 and 86 so that the outer surface 92 (FIG. 6) of each core member 90, when in place, is substantially flush with the rear face 50 of mold section 32.

The pair of core members 90 have an identical construction, which is formed of a dry sand produced in any suitable manner known to the foundry art by mixing sand with a binder and then baking. The resulting structure is a rigid, coarse sand composition having a plate-like body portion 94 as partially depicted in FIG. 8.

Along alternate vertical rows across the width of the plate-like body portion 94 of core member 90 are formed a plurality of relatively shallow core cavities 96 and 98 extending inwardly into body portion 94, respectively, from its opposite flat surfaces 92 and 93. These core cavities 96 and 98 are in alternate staggered relationship with respect to each other and seat over the open gate ends of mold cavities 52 and 34, respectively, as shown in FIG. 6. As clearly illustrated in FIGS. 6 and 7, the vertical rows of cavities 96 and 98 are in direct communication with the vertical runner passageways 40 and 62, respectively to feed the molten metal into the cavities 52 and 34.

To insure that the sand core member 90 is always properly placed into both rectangular recesses 84 in rear face 50, a pair of locating ears 100 (FIGS. 3, 4 and 8) are provided near the top of rear surface 93 of sand core member 90 which align with a pair of orienting apertures 102 in the rear face 50 if the sand core member 90 is correctly oriented.

The use of a core member (such as the above described core member 90) having a plurality of shallow core cavities to direct the molten metal into the mold cavities of a mold section has previously been disclosed in a patent to Wells et al., U.S. Pat. No. 2,940,142, which is assigned to the same assignee as this invention. There is a significant difference, however, in the construction of the core member 90 of this invention as compared to the core member described in the referenced Wells et al. patent. In the Wells et al. patent, all the shallow core cavities extend from the plate-like body portion in only one direction to seat over horizontal rows of vertically-oriented mold cavities. By contrast, the core member 90 of this invention uses shallow cavities 96, 98 extending from both surfaces 92, 93 of the plate-like body portion 94 of core member 90 to feed a molten metal to horizontal cavities 52, 34 disposed on both sides of the core member 90.

The reason for employing the core member 90 in this invention is the same as in the mold assembly of the Wells et al. patent, namely to provide shallow core cavities 96 and 98 (called heat retention zones) of predetermined depths in order to pre-heat the core portions 104 and 106, respectively, across the open ends of mold cavities 52 and 34 with molten metal prior to the flow of the metal through the center ingates 108 and 110, respectively, surrounded by the respective core portions 104, 106. As was pointed out in the Wells et al. patent, a heat retention zone (shallow core cavities 96 and 98) provided in this manner makes the effective distance between the runner passageway and the mold cavity so short that the molten metal at the gate end of each cavity cannot solidify until molten metal in the runner passageway is ready to solidify. Thus, the gate end of the casting cools slowly and is self-annealing for a prolonged period with the result that improved hardness properties are obtained in the casting at the gate end.

Also, as disclosed in the above-referenced Wells et al. patent, for best results the depth of the shallow core cavities 96 and 98 and the thickness of the corresponding core portions 104 and 106 should be made substantially equal to provide a heat retention zone around their respective center ingates 108 and 110 during the flow of molten metal therethrough, and thereby prevent premature hardness of the molten metal at the gate end.

For the purpose of identifying the gate end of the castings, the core portions 104 and 106 may be provided at their inner ends with integral protrusions 112 and 114, respectively, which have ring-shaped configurations and surround the respective center ingates 108 and 110.

One obvious advantage over the Wells et al. patent is that by using a core member having core cavities formed in opposite surfaces provides a great savings in the material and labor used in forming the sand core members in the order of two times as many castings can be formed per core member. A less apparent but more important advantage over the teachings of the Wells et al. patent is that the sand core member 90 of this invention is sandwiched between abutting faces having a plurality of horizontal mold cavities on opposite sides of core member 90 to provide a great concentration of heat in the center of the mold when the molten metal is flowing between the opposed faces. This concentration of heat along the parting line of adjoining mold sections 32 permits the gate end of the castings to cool slowly and consequently is self-annealing for a prolonged period with the result that improved hardness properties are obtained in the casting at the gate end.

The runner system for the embodiment depicted in FIGS. 3 through 7 is particularly designed to concentrate the heat in the center of the mold pattern formed between abutting faces. By shaping the vertical runner passageways 40 and 62 to gradually widen in an upward direction, the volume of molten metal across the gate end of cavities 34 is much greater for the mold cavities located at the upper ends of the vertical rows. This greater volume in the runner passageways 40, 62 prolongs the cooling of the gate end of the casting to provide a softer and more uniform gate end. The reason for designing the runner passageways 40 in this fashion is to compensate for the slight decrease in temperature as the molten metal rises up each vertical runner passageways 40, 62. Additional heat concentration is provided by the upper pair of cross runner passageways 76 and 78. The molten metal upon reaching the upper end of vertical runner passageways 40 and 62 fills the upper cross runner passageway 76 and 78 with the unwanted gases exiting through the respective gas ports 80 and 82. The upper cross runner passageway 76 is formed substantially larger than the lower cross runner passageway 74 for holding a large volume of the molten metal which serves as a heat bank for the mold cavities 34 and 52 at the upper portion of the mold.

When compared with all known prior art molds, the above-described mold assembly 30 permits the hardness values at the cam end of the castings to be more uniformly controlled and to be cooled at a faster rate due to the location of the runner passageways. In the prior art horizontal-stack mold assemblies, the runner passageways for the mold cavities in each mold section are provided in the lower surface of the mold section immediately above, and consequently the runner passageways are in close proximity to the cam end of the mold cavities in the above mold section, resulting in a slower cooling rate of the cam end of the castings which should cool faster than the gate end. Consequently, it would be preferable to have the runner passageways remotely located away from the cam end of the castings. This invention provides such an arrangement. As illustrated in FIG. 6, the runner passageways 62, 40 between abutting faces 36, 50 of successive mold sections 32 are separated from the cam end of the mold cavities 34, 52 on opposite faces 36, 50 of the same mold section by at least the length of the cavities 34, 52 which spatial relationship will exist as long as the width of each mold section 32 is greater than two times of either of the lengths of cavities 34 or 52.

By virtue of this arrangement, the heat at the cam end of the castings is quickly conducted away from the casting due to the large volume of sand surrounding the cam end of each cavity to provide increased carbides at the cam end, and the heat at the gate end of the castings cools very slowly due to the great concentration of molten metal at this end to provide an annealing effect at the gate end. As a result, a greater hardness differential between the two ends (cam end and gate end) of a valve lifter casting is possible providing greater wearing properties of the cam face and increased machineability of the gate end.

Figures 10, 11, 12:
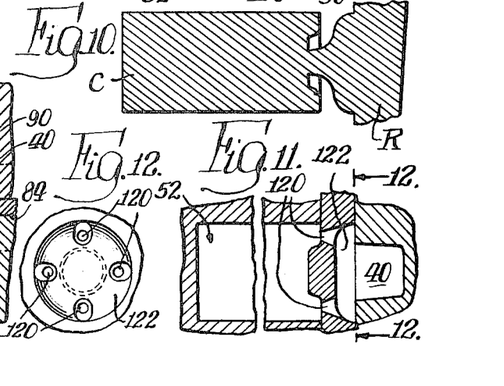
FIG. 10 is a side view illustrating the casting formed in the FIG. 9 mold cavity and associated runner portion.
FIG. 11 is an enlarged fragmentary sectional view illustrating the arrangement of a single mold cavity and a portion of a core member having a modified ingate structure for the core member illustrated with FIGS. 3 through 6.
FIG. 12 is a cross sectional view taken along the line 12—12 of FIG. 11.

After the poured metal has been allowed to cool sufficiently to permit the removal of the castings, the mold sections 32 are broken, leaving a plurality of valve lifter castings C, one such casting being shown in FIG. 10, joined to a casted runner R. As illustrated in FIG. 10, the relatively narrow diameter of the center ingates 108, 110 causes the runner neck portion joined to the gate end of the casting C to be quite narrow which permits the ready removal of this portion form the casting C.

Rockwell hardness readings obtained on castings produced in accordance with this invention when utilizing the core member 90 were found to produce substantial improvements in hardness values, particularly at the gate end. The Rockwell "C" hardness at the gate end portion of the castings ranged between 25 and 30.

A slightly modified version of the core member 90 is illustrated in FIGS. 11 and 12, where the center ingates 108, 110 of the shallow core cavities 96, 98 are replaced by four equally spaced ingates 120 formed in a shallow core cavity 122 about the open end to mold cavity 52. The advantage of using a plurality of ingates spaced around the open end of the mold cavities is that it permits faster pouring and thereby reduces hardness at the gate end for improved machineability. The use of a plurality of spaced ingates also avoids a problem arising with the use of center ingates which is that the gate stub of the formed casting does not always break off flush with the gate end of the casting resulting in interference with the probe used during orientation and with the tool used in machining the gate end. By comparison, the casting stubs resulting from using four spaced rim gates 120 can be easily ground off by a machine instead of the more costly method of chipping them off by hand, which is necessary in removing the center gate stubs. It is of course obvious that more or less than four spaced ingates 122 could be used.

ANOTHER EMBODIMENT

There is illustrated in FIGS. 13 through 17, another embodiment embodying the principles of this invention. Each mold section 200 of this embodiment is constructed in a similar manner to the previously described mold section 32. Thus, each mold section 200 could be formed in a molding machine such as described with reference to FIGS. 1 and 2 and then pushed into abutting engagement with a preceding mold section to provide a complete mold assembly. It is noted, however, that sand core members are not used in this embodiment.

Figure 13:
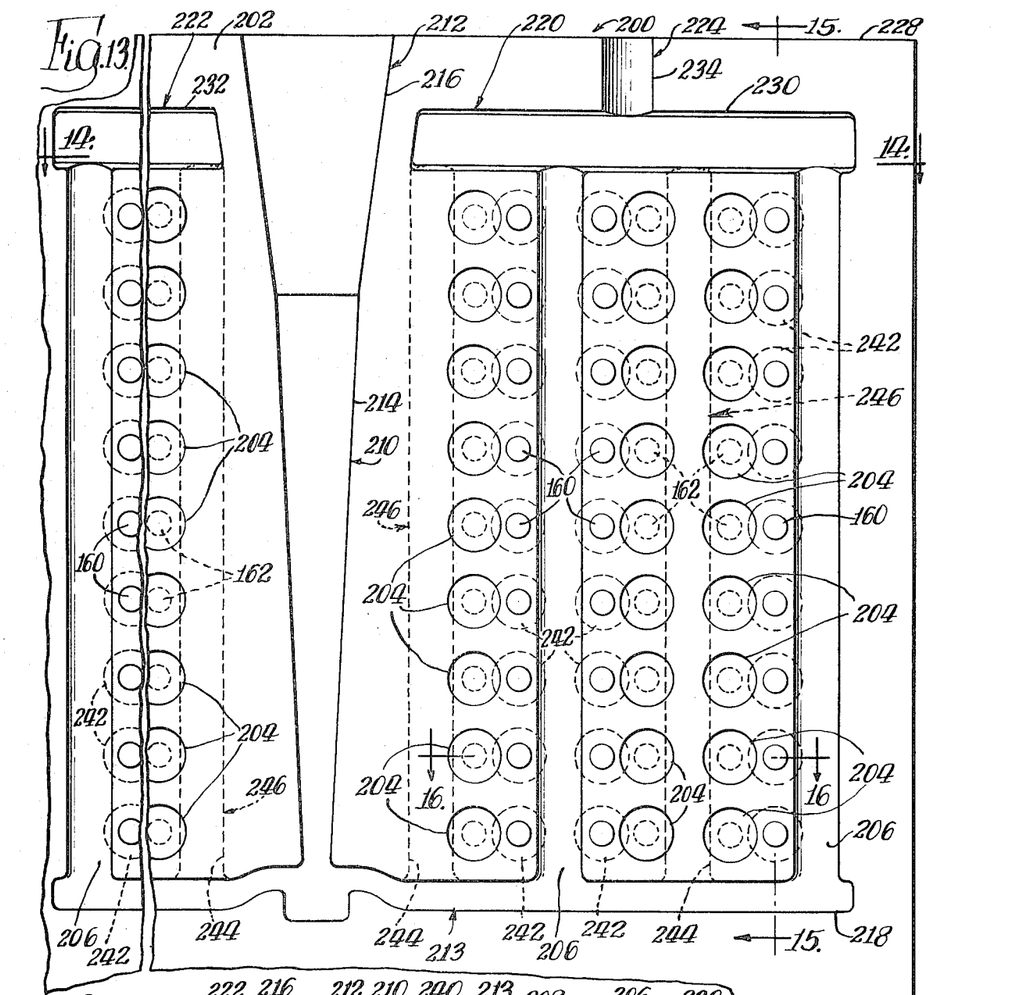
FIG. 13 is an alternate embodiment embodying the principles of this invention partially showing one end face of a mold section constructed in accordance with the principles of this invention.
Figure 14:
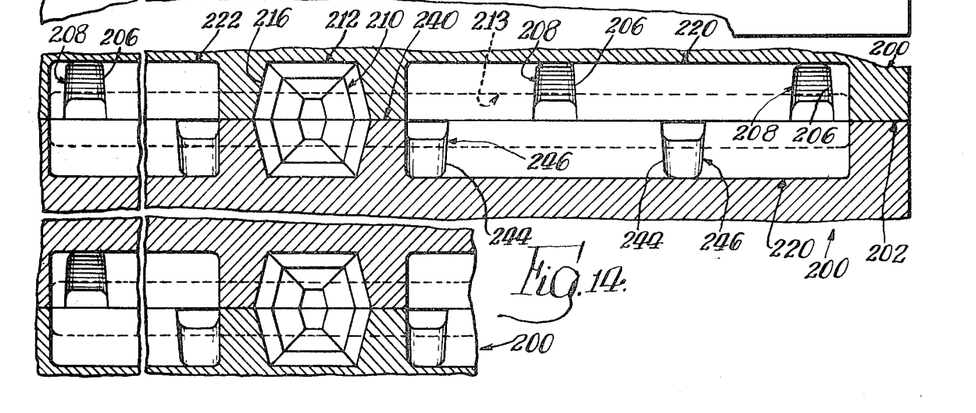
FIG. 14 is a sectional view taken along the line 14—14 of FIG. 13.
Figures 15, 17, 18:
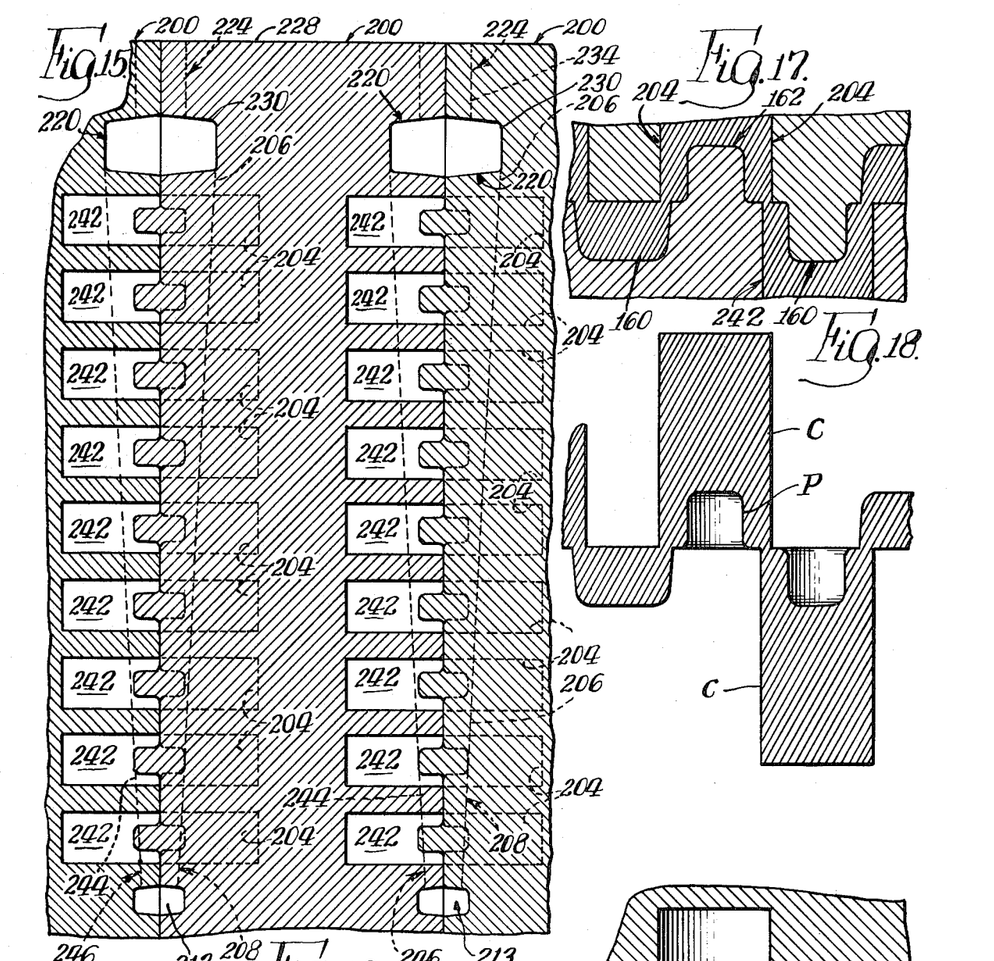
FIG. 15 is a partial sectional view taken along the line 15—15 of FIG. 13.
FIG. 17 is an enlarged, fragmentary, sectional view illustrating the gate end portion of two mold cavities and their associated runner passageway formed in the abutting face with a molten metal filling each cavity and corresponding runner passageway.
FIG. 18 is an enlarged, fragmentary, view illustrating the resulting mold casting structure of FIG. 17 after the sand mold has been removed.
Figure 16:
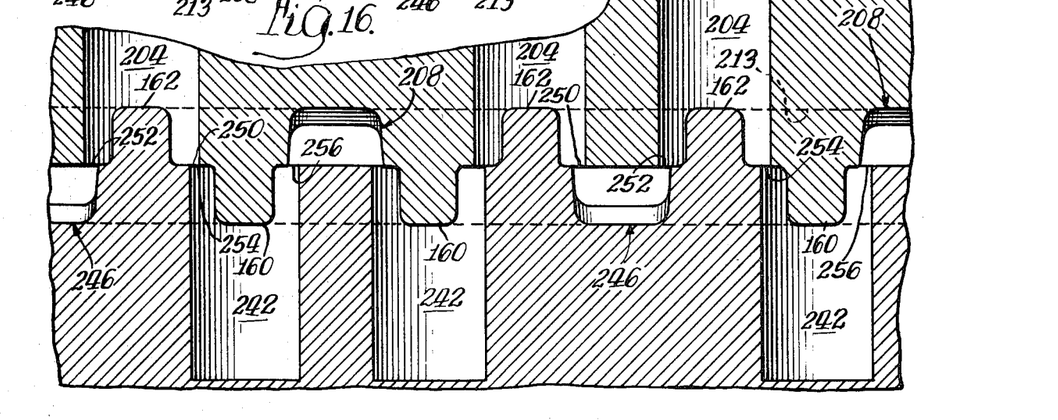
FIG. 16 is a partial sectional view taken along the line 16—16 of FIG. 13.

In FIG. 13, there is shown the front face 202 of a mold section 200 having a plurality of horizontal mold cavities 204 across its width in spaced vertical rows, and a plurality of vertical U-shaped recesses 206 which form vertical runner passageways 208 when the front face 202 is placed in abutting relation with the rear face of a preceding mold section (see FIGS. 14, 15 and 16). The U-shaped vertical recesses 206 have a constant width dimension along their length which is sufficiently wide to overlap with the open ends of a pair of adjacent mold cavities in the opposing abutting face as illustrated in FIG. 16. The depth dimension of the vertical U-shaped recesses 206 gradually increase from the lower end to the upper end.

The vertical runner passageways 208 are connected to a vertical downsprue 210 extending downwardly from a pouring cup 212 by means of a lower cross runner passageway 213 connected to the lower end of downsprue 210 and vertical runner passageways 208. Half of the downsprue passageway 210, pouring cup 212 and cross runner passageway 213 are formed by, respectively, vertical U-shaped recess 214, vertical U-shaped recess 216 and horizontal lower U-shaped recess 218 in the front face 202 of mold section 200. The other half of the downsprue 210, pouring cup 212, and lower cross runner passageway 213 are provided by mating U-shaped recesses in the rear wall 240 of the preceding mold section 200. Similarly, the upper open ends of vertical runner passageways 208 are in direct communication with one of a pair of upper cross runner passageways 220 and 222 on opposite sides of downsprue 210, which are in direct communication with the atmosphere by means of a pair of gas ports 224, respectively, extending between the mid-section of respective upper cross runner passageways 220, 222 and the top surface 228 of mold section 200. Half of the upper cross runner passageways 220, 222 and their corresponding pair of gas ports 224 are formed, respectively, by horizontal U-shaped recesses 230, 232 and a pair of vertical arcuate recesses 234, the other half of these passageways being formed by mating identically shaped recesses in the rear face of an adjoining mold section 200 which is in abutting relation with front face 202.

The rear face 240 of each mold section 200 has a plurality of identically shaped horizontal mold cavities 242 arranged in a series of vertical rows across the width of its face, and a plurality of vertical U-shaped recesses 244 forming vertical runner passageways 246 when the rear face 240 is in an abutting relation with opposing front face 202 of a succeeding mold section 200. The vertical runner passageway 246 has its lower end in communication with lower cross runner passageways 213 and has its upper ends in communication with one of the pair of upper cross runner passageways 230, 232 depending on which side of the downsprue 210 the particular vertical runner passageway 246 is located.

One important aspect of this embodiment is the relative position of the vertical runner passageways 246 and vertical rows of mold cavities 242 on the rear face 240 of each mold section 200 with respect to the vertical runner passageways 208 and vertical rows of mold cavities 204 on the front face 202 of a mold section 200 when these two faces are in an abutting relationship. The vertical runner passageways 208 on the front face 202 overlap with an arcuate portion of all the mold cavities 242 in adjacent pairs of vertical rows in the rear face 240 of an adjoining mold section 200. Similarly, the vertical runner passageways 246 overlap with an arcuate portion of all the mold cavities 204 disposed in adjacent pairs of vertical rows of mold cavities in the front face 202 of the preceding mold section 200. Diametrically opposite from these arcuate portions overlapped by the vertical runner passageways 206, 246 of the opposing abutting faces, the mold cavities 204, 242 in each vertical row have an arcuate portion which overlaps with a corresponding arcuate portion in the mold cavity formed in the opposite abutting face. The effect of this arrangement is to provide each mold cavity 204, 242 with diametrically opposite ingates 250, 252 and 254, 256, respectively, for respective horizontal mold cavities 204 and 242. Having two diametrically opposite ingates for each mold cavity 204, 242 permits the molten metal to enter these cavities through diametrically opposite openings to provide uniform softness across the gate end of the casting.

For the purpose of providing a deep pocket into the center of the valve lifter castings at their gate end, a plurality of protrusions 160, 162 (shown in FIG. 16) extend, respectively, from the front and rear faces 202, 240 of each mold section 200 and are adapted to be received in the center of the gate end opening of each mold cavity 242, 204, respectively, in the opposing abutting face of adjoining mold sections. It is noted that the protrusions 160, 162 have a much greater size and extend into each mold cavity a relatively greater distance than the prior art protrusions, which are provided only as a means of identifying the gate end of each casting. The protrusions 112, 114 formed with the core member 90 in the first described embodiment are typical of such prior art uses, and it is noted their height dimension is relatively much smaller than the height of protrusions 160, 162 of the second embodiment. It can be readily appreciated that protrusions 160, 162 cause a relatively deep pocket P to be formed at the gate end of the valve lifter castings C, such as is illustrated in FIG. 18.

There are a number of distinct advantages which result from having such a deep pocket in a valve lifter casting, in addition to providing a quick means of identifying the gate end of each casting. One major advantage is that the cost of machining is greatly reduced, for there is less metal to be removed and the deep pocket permits higher feeds and speeds for machining the pocket at the gate end. Also, since there is less metal to be removed, there is a savings in the cost of wasted metal.

The manner of using the embodiment illustrated in FIGS. 13 through 17 is the same as the embodiment of FIGS. 1 through 7 except that a core member is not placed between the abutting surfaces of each pair of adjoining mold sections. After the mold sections 200 have been formed and assembled together in an abutting relation (as depicted in FIG. 2), a metal or alloy of desired composition and at the desired temperature is poured into the pouring cup 212 where it flows through downsprue passageway 210 and across the two branches of lower cross runner passageway 213 and rises upwardly along vertical runner passageways 208 and 246 filling each mold cavity 204, 242 through their diagonally opposite ingates 250, 252 and 254, 256, respectively, as the level of molten metal rises upwardly along the vertical runner passageways 208, 246. When the level of the molten metal reaches the upper end of vertical runner passageways 208 and 246, it fills the pair of upper cross runner passageways 220, 222 and the gases escape through their ports 224.

As in the FIGS. 3 through 7 embodiment, the pair of upper cross runner passageways 230, 232 serve as a heat bank or reservoir to maintain the temperature of the molten metal along the upper portions of vertical runner passageways 208, 246 at a high temperature for a prolonged period. By virtue of the fact that the depth of the cross runner passageways 206, 246 increases in an upward direction a greater volume of molten metal is present over the gate end of the upper mold cavities 204, 242 which compensates for the slight decrease in temperature of the molten metal as it rises up the vertical runner passageways 208, 246.

Because of the concentrated heat in the center of the mold created by the runner system and many opposed mold cavities, heat conductivity is reduced from the gate end of each mold cavity with the result that lower hardness of the sidewall portions surrounding the pockets P of castings C (FIG. 18) results. If it were not for this great concentration of heat, it would not be possible to provide such a deep pocket P since the gate end portion surrounding the pockets would cool at too rapid a rate resulting in unwanted and unwarranted carbides. Consequently, by having this great concentration of heat at the gate end of the mold cavities 204, 242, it is possible to produce a casting C such as illustrated in FIG. 18 having a deep pocket P at its gate end without the sacrifice of lowering the machining properties at the gate end of each casting C.

As previously mentioned, the purpose of providing a pair of ingates for mold cavities 204, 242 at diametrically opposite positions is to produce castings having more uniform hardness across its cross section at the gate end. In testing casings made in accordance with the principles of FIGS. 13 through 17 embodiment, it was found that the castings using two diametrically opposite ingates had Rockwell C hardness values across the gate end portion in the range of 25 – 35; whereas castings formed with only one ingate into the mold cavity were characterized by Rockwell "C" hardness values in the range of 28 – 48.

In both embodiments of this invention, namely the embodiment of FIGS. 3 through 7 and the embodiment of FIGS. 13 through 17, the runner passageways for feeding the molten metal into the cavities is located at the gate end of the mold cavities. By contrast, in the prior art valve lifter molds, the runner system to the cavities is formed in the bottom surface of the immediately above mold section and is only a short distance from the cam end of the mold cavities in the above mold section. By having the runner system to the mold cavities at the gate end of the mold cavities, there are two distinct advantages over the prior art molds. One advantage is that along the parting line between abutting faces there is a great concentration of heat with the result that the castings at the gate end cool over a prolonged period for softer values. Another advantage is that the cam end of the castings can cool at a much quicker rate since there is no runner passageway adjacent to the cam end of the mold cavities. Consequently, a greater hardness differential between the two ends (cam end and gate end) of the valve lifter castings is possible when compared with prior art molds, resulting in greater wearing properties of the cam face and increased machineability of the gate end. By making the thickness of the mold sections 32 and 200 of the two embodiments between the front and rear faces greater than twice as thick as the length of one of the mold cavity, respectively, 52, 34 or 204, 242 (see FIGS. 6 and 15) there is a great volume of sand about each mold cavity for permitting the cam ends of the castings being formed to cool rapidly.

We claim:

1. A mold assembly comprising a plurality of mold sections arranged with the front face of one mold section in abutting and cooperating relationship with the rear face of the preceding mold section, a plurality of horizontal mold cavities formed in a series of spaced vertical rows across each of said faces with the mold cavities in one face in an alternate staggered relationship with the mold cavities in the opposing face, a plate-like sand core member seated in a shallow vertical pocket formed between said opposing faces of adjoining mold sections, said core member having a plurality of individual relatively shallow core cavities arranged in a series of spaced vertical rows with alternate vertical rows of said shallow core cavities recessed from opposite surfaces of said plate-like core member, the outer ends of said core cavities being enlarged and having a diameter substantially equal to the diameter of the corresponding mold cavities, the inner ends of said core cavities having at least one restricted opening in communication with said corresponding mold cavities, a plurality of vertical casting runner passageways formed in said opposing faces in direct communication with said outer ends of said shallow core cavities, a pouring cup formed between said abutting faces, and runner passageways interconnecting said pouring cup and said vertical runner passageways.

2. A mold assembly as defined in claim 1, wherein said at least one restricted opening at the inner end of each of said shallow core cavities in said core member comprises a center ingate opening.

3. A mold assembly as defined in claim 1, wherein said at least one restricted opening at the inner end of each of said shallow core cavities in said core member comprises a plurality of spaced restricted openings arranged in a circle.

4. A mold assembly as defined in claim 1, wherein the distance between the front and rear faces of each mold section is greater than two times the length of one of said mold cavities to permit the portion of the casting being formed at the inner end of said mold cavities to cool quickly.

5. A mold assembly as defined in claim 1, wherein said casting runner passageways interconnecting said vertical runner passageways include a lower cross runner passageway, a downsprue passageway extending from said pouring cup, and an upper cross runner passageway, said lower cross runner passageway being in communication with said downsprue and the lower open ends of said vertical runner passageways in said opposing faces, and said upper cross runner passageway being in communication with the upper open ends of said vertical runner passageways in said opposing faces.

6. A mold assembly as defined in claim 5, wherein said vertical runner passageways in said opposing faces gradually increase in size in an upward direction between said lower and upper open ends.

7. A mold assembly comprising a plurality of mold sections arranged with the front face of one mold section in abutting and cooperating relationship with the rear face of the preceding mold section, one of the opposing faces of the adjoining mold sections having a shallow vertical recess and a plurality of horizontal mold cavities in a series of spaced vertical rows behind said shallow recess, the other of said opposing faces of said adjoining mold section having a plurality of horizontal mold cavities in a series of spaced vertical rows and in an alternate staggered relationship with said mold cavities in said one face, a plate-like sand core member removably seated in said shallow vertical recess in said one face of each mold section and essentially flush therewith, each of said core members having a plurality of individual relatively shallow core cavities arranged in a series of spaced vertical rows in alignment with the mold cavities of said opposing faces with the alternate vertical rows of said shallow core cavities recessed from opposite surfaces of said plate-like core member, the outer ends of each shallow core cavities being enlarged and having a diameter substantially equal to the diameter of the corresponding mold cavities, the inner ends of said core cavities having at least one restricted opening in communication with said corresponding mold cavities, a plurality of vertical runner passageways formed in said shallow recess of said one face in direct communication with said outer ends of said shallow core cavities on one surface of said core member seated in said shallow recess of said one face, and a plurality of vertical casting runner passageways formed in said other of said opposing faces in direct communication with said outer ends of said shallow cavities on the opposite surface of said core member, a pouring cup formed between abutting faces of adjoining mold sections, and runner passageways interconnecting said pouring cup and said vertical casting runner passageways.

8. A mold assembly as defined in claim 7, wherein said at least one restricted opening at the inner ends of each of said shallow core cavities in said core member comprises a center ingate opening.

9. A mold assembly as defined in claim 7, wherein said at least one restricted opening at the inner ends of each of said shallow core cavities in said core member comprises a plurality of spaced restricted openings.

10. A mold assembly as defined in claim 7, wherein the distance between the front and rear faces of each mold section is greater than two times the length of one of said mold cavities to permit the cam end of the casting being formed to cool quickly.

11. A mold assembly as defined in claim 7, wherein said runner passageways interconnecting said vertical runner passageways include a lower cross runner passageway, a downsprue passageway extending from said pouring cup, and an upper cross runner passageway, said lower cross runner passageway being in communication with said downsprue and the lower open ends of said vertical runner passageways in said opposing faces and said upper cross runner passageway being in communication with the upper open ends of said vertical runner passageways in said opposing faces.

12. A mold assembly as defined in claim 7 wherein said vertical runner passageways in said opposing faces gradually increase in size in an upward direction between said lower and upper open ends.

* * * * *